(12) United States Patent
Kuemmlee

(10) Patent No.: US 11,496,025 B2
(45) Date of Patent: Nov. 8, 2022

(54) STATOR FOR AN ELECTRIC ROTATING MACHINE

(71) Applicant: Siemens Aktiengesellschaft, Munich (DE)

(72) Inventor: Horst Kuemmlee, Berlin (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 889 days.

(21) Appl. No.: 16/334,245

(22) PCT Filed: Jul. 20, 2017

(86) PCT No.: PCT/EP2017/068365
§ 371 (c)(1),
(2) Date: Mar. 18, 2019

(87) PCT Pub. No.: WO2018/050331
PCT Pub. Date: Mar. 22, 2018

(65) Prior Publication Data
US 2019/0229594 A1    Jul. 25, 2019

(30) Foreign Application Priority Data
Sep. 19, 2016   (EP) .................... 16189489

(51) Int. Cl.
*H02K 15/00* (2006.01)
*H02K 3/12* (2006.01)
(Continued)

(52) U.S. Cl.
CPC ......... *H02K 15/0025* (2013.01); *B63H 21/17* (2013.01); *H02K 3/12* (2013.01);
(Continued)

(58) Field of Classification Search
CPC ........ H02K 15/0025; H02K 3/12; H02K 3/28; H02K 3/505; H02K 15/045; H02K 15/04;
(Continued)

(56) References Cited

U.S. PATENT DOCUMENTS 4,115,915 A * 9/1978 Godfrey ................. H02K 3/505
310/71
5,623,178 A * 4/1997 Kawabata ............... H02K 3/505
310/260
(Continued)

FOREIGN PATENT DOCUMENTS

CN    104852498 A   8/2015
DE    19914942 A1   10/2000
(Continued)

OTHER PUBLICATIONS

PCT International Search Report and Written Opinion of International Searching Authority dated Aug. 28, 2017 corresponding to PCT International Application No. PCT/EP2017/068365 filed Jul. 20, 2017.

*Primary Examiner* — Ryan J. Walters
(74) *Attorney, Agent, or Firm* — Henry M. Feiereisen LLC

(57) ABSTRACT

The invention relates to a stator (8) for an electric rotating machine (2), which stator has a laminated stator core (16) having coil bars (20) and has at least one stator winding head board (24) having an insulating main body (28). In order to reduce the axial length of the stator (8), according to the invention, conducting tracks (26) are integrated into the insulating main body (28), wherein the at least one stator winding head board (24) lies on an end face (23) of the laminated stator core (16) and wherein the conducting tracks (26) are integrally bonded to the coil bars (20).

24 Claims, 6 Drawing Sheets

(51) Int. Cl.
*H02K 3/50* (2006.01)
*B63H 21/17* (2006.01)
*H02K 3/28* (2006.01)
*H02K 15/04* (2006.01)
*B23P 19/04* (2006.01)
*B63H 5/125* (2006.01)

(52) U.S. Cl.
CPC ............... *H02K 3/28* (2013.01); *H02K 3/505* (2013.01); *H02K 15/045* (2013.01); *B23P 19/04* (2013.01); *B23P 2700/12* (2013.01); *B63H 2005/1258* (2013.01)

(58) Field of Classification Search
CPC . B63H 21/17; B63H 2005/1258; B23P 19/04; B23P 2700/12

See application file for complete search history.

(56) References Cited

U.S. PATENT DOCUMENTS

| | | | | |
|---|---|---|---|---|
| 5,823,178 | A | | 10/1998 | Lloyd et al. |
| 7,582,999 | B2 | * | 9/2009 | Atkinson ................. H02K 3/50 310/179 |
| 11,165,310 | B2 | * | 11/2021 | Sewiolo ................... H02K 9/22 |
| 2004/0100157 | A1 | * | 5/2004 | Bori ................... H02K 15/0056 310/201 |
| 2007/0273218 | A1 | * | 11/2007 | Atkinson ................. H02K 3/50 310/201 |
| 2014/0319960 | A1 | * | 10/2014 | Iki ........................... H02K 3/12 310/216.115 |
| 2015/0280503 | A1 | * | 10/2015 | Takahashi ............... H02K 3/50 310/201 |

FOREIGN PATENT DOCUMENTS

| | | |
|---|---|---|
| DE | 102009032882 B3 | 11/2010 |
| DE | 102014207621 A1 | 10/2014 |
| EP | 1742330 B1 | 9/2009 |
| EP | 2621062 A1 | 7/2013 |
| SU | 132307 A1 | 11/1960 |
| SU | 1390711 A1 | 4/1988 |

\* cited by examiner

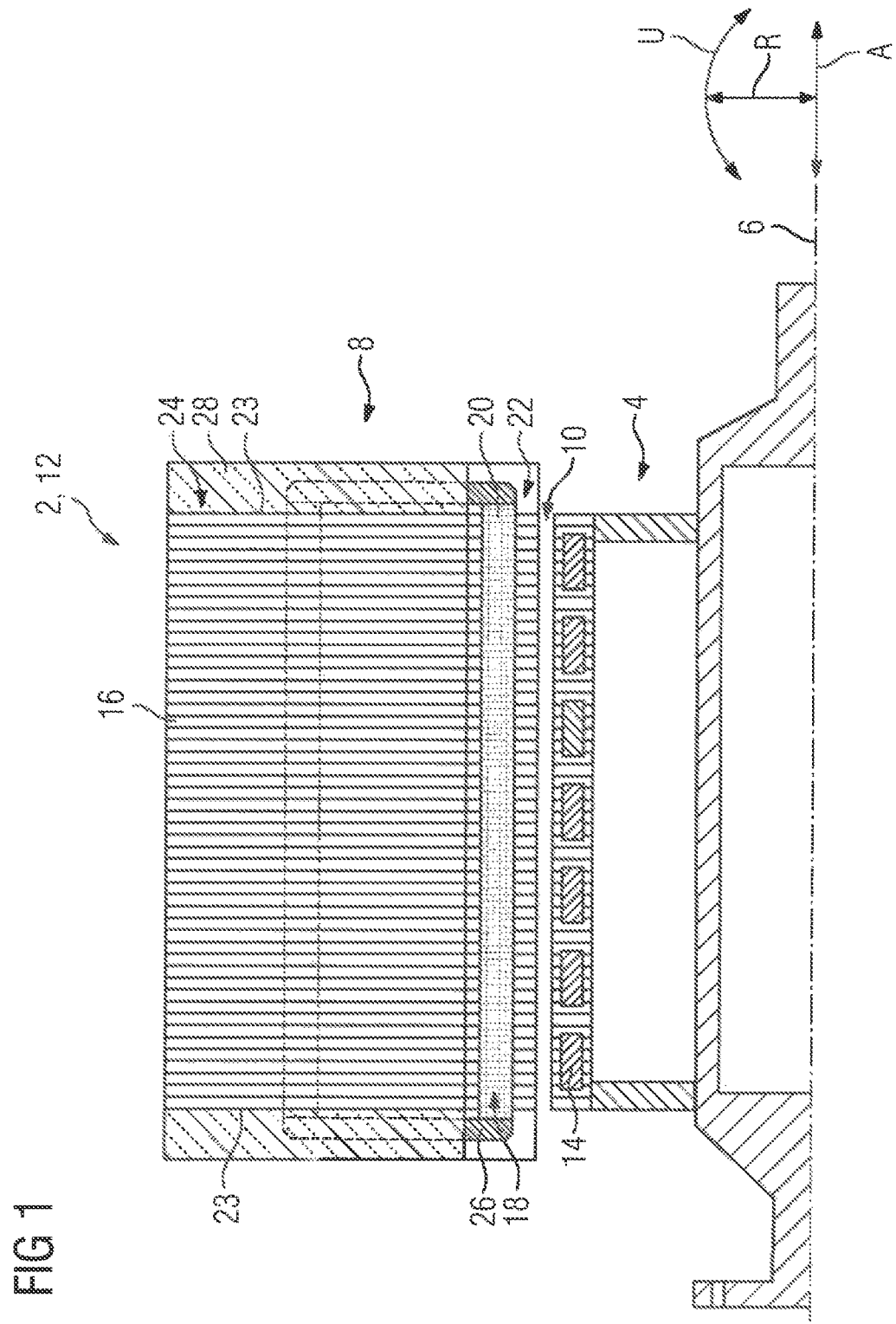

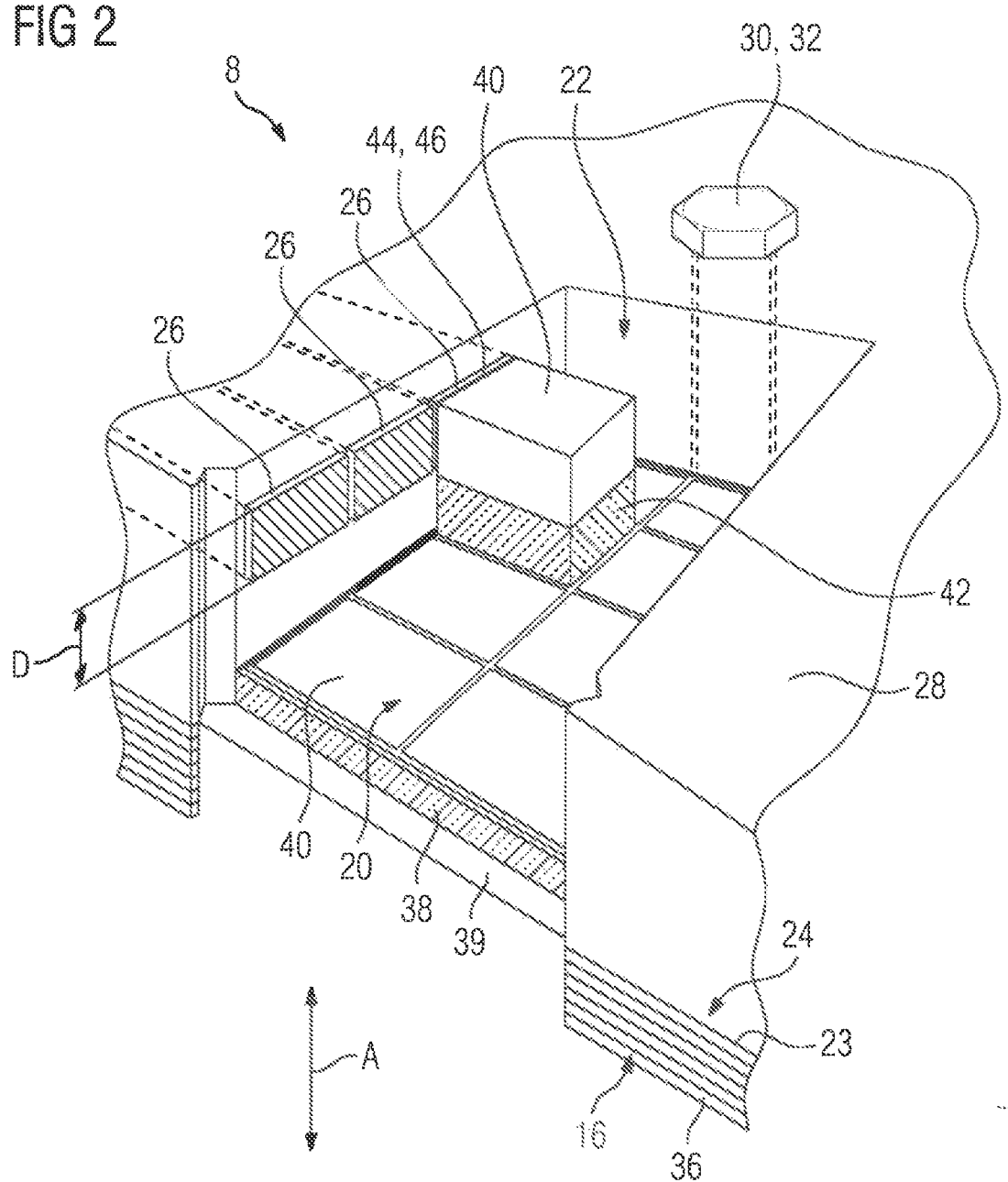

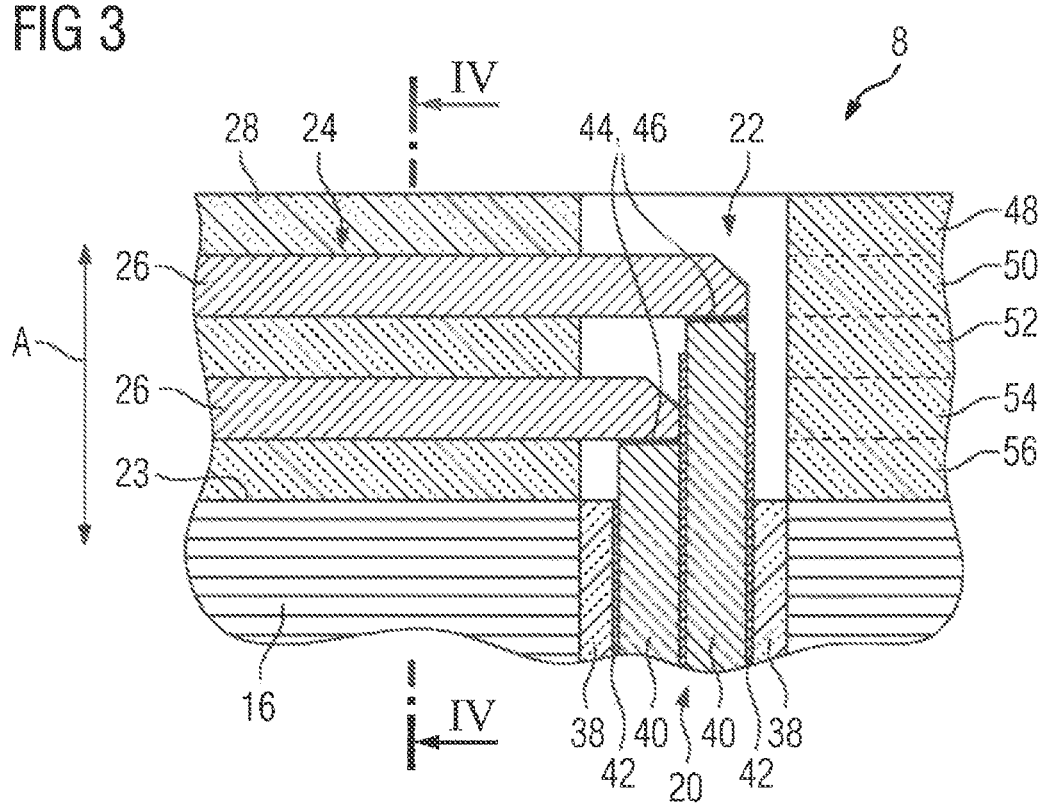

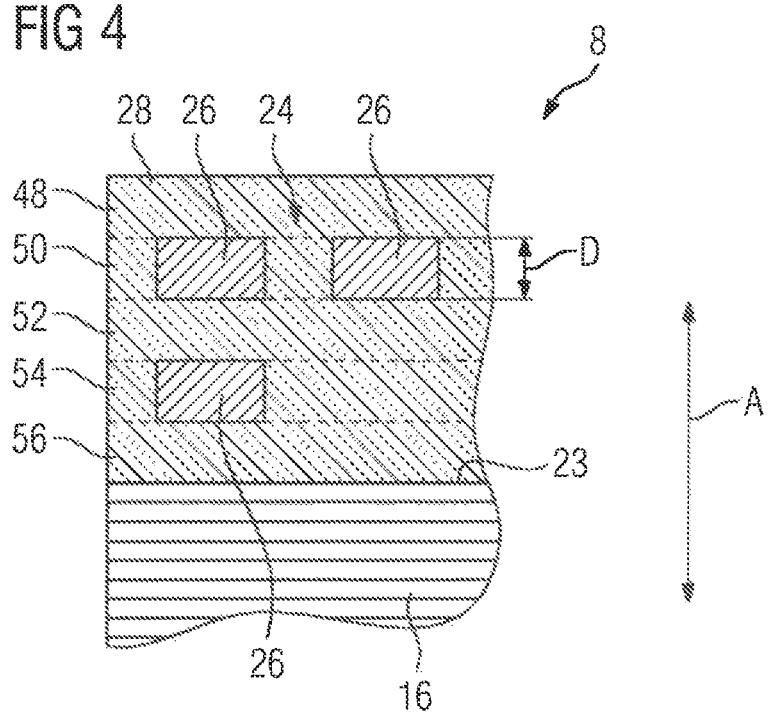
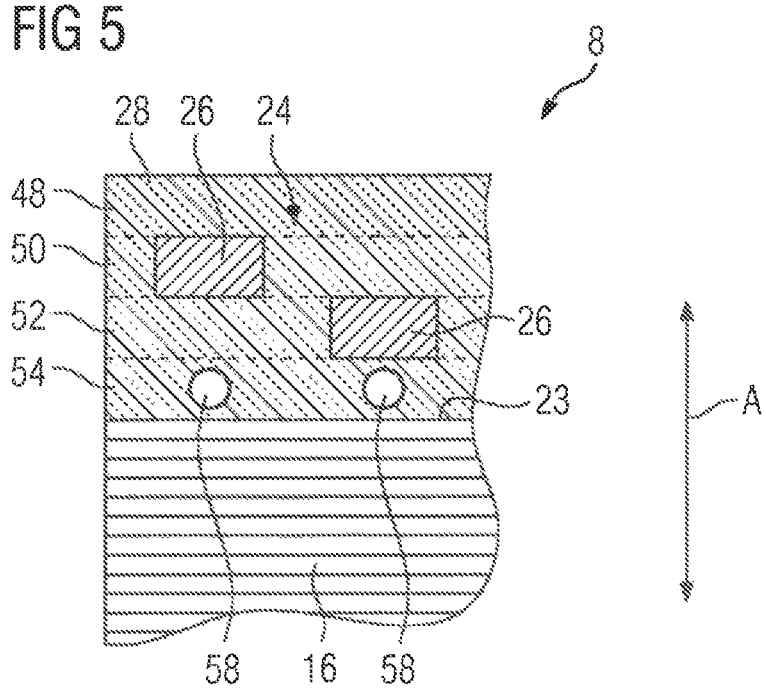

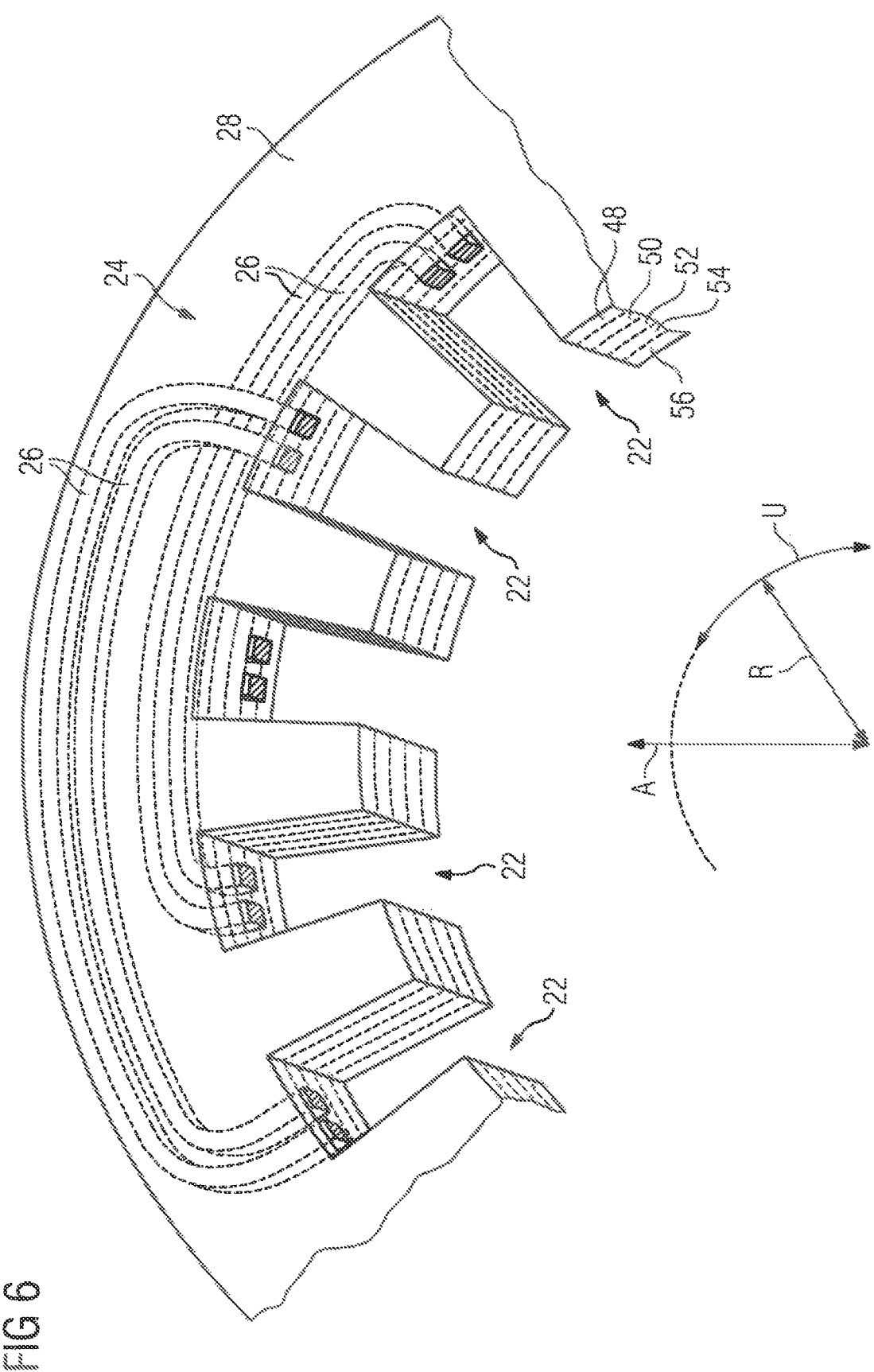

STATOR FOR AN ELECTRIC ROTATING MACHINE

CROSS-REFERENCES TO RELATED APPLICATIONS

This application is the U.S. National Stage of International Application No. PCT/EP2017/068365, filed Jul. 20, 2017, which designated the United States and has been published as International Publication No. WO 2008/031536 and which claims the priority of European Patent Application, Serial No. 16189489.4, filed Sep. 19, 2016, pursuant to 35 U.S.C. 119(a)-(d).

BACKGROUND OF THE INVENTION

The invention relates to a stator for an electric rotating machine.

The invention additionally relates to an electric rotating machine with at least one stator of this kind.

The invention further relates to a pod drive with at least one electric rotating machine of this kind.

The invention also relates to a ship with at least one pod drive of this kind.

The invention further relates to a method for manufacturing a stator of this kind.

A stator of this kind preferably occurs in an electric rotating machine, in particular in a motor or generator, which is employed in ship construction, and has a power consumption of at least of one megawatt.

The stator windings of an electric rotating machine of this kind are generally embodied as preformed coils, also known as bar coils. Preformed coils are for example manufactured by means of casting or powder metallurgy. A winding head, created through the bending at right angles of the conductors of the preformed coils is located on the ends of the preformed coils. This winding head requires a significant axial installation space. Ohmic losses, which reduce the efficiency of the electric rotating machine, occur through the additional inactive conductor length of the winding head. In addition it is necessary to cool the winding heads. Further installation space is required for cooling purposes.

Particularly in the case of fast-running low-pole machines, the increased bearing clearance resulting from the winding heads has a disadvantageous effect on the rotor dynamics. Furthermore, additional complex stiffening measures are required as a result of the great conductor lengths, in order to prevent impermissible oscillations and deformations during operation. In addition the overall length and the weight of the electric rotating machine increase. Particularly in the case of a modular structure of large machines, in which multiple sub-machines in the axial direction form a complete machine, significant electrically unused lengths arise as a result of the winding heads.

The patent specification DE 10 2009 032 882 B3 describes a method for manufacturing a preformed coil for a stepped winding of a dynamoelectric machine and a preformed coil manufactured by means of the method cited. In order to simplify the manufacture of the preformed coil, this is manufactured from a raw coil, wherein the raw coil has two longitudinal sides, which are provided to be inserted into slots of a stator or a rotor of the dynamoelectric machine. The raw coil has two winding head sides, which are provided in each case to form a winding head of the preformed coil, wherein the longitudinal sides are bent through 90° in such a way as to insert the longitudinal sides into the slots and offset the winding head sides from the longitudinal sides.

The published patent application DE 199 14 942 A1 describes a method for manufacturing a stator winding for an electric machine and such a stator winding. The machine has pronounced poles. With their ends, coil conductors project over the laminated stator core in an axial direction and are fixed in module clamps. On the modules are located conducting tracks, which form the windings with the conductors or run from clamps to external attachment points.

Patent specification EP 1 742 330 B1 describes a stator winding head for a stator part of a turbo generator. The stator winding head is in the form a disk with a central outlet for the passage of a rotor, wherein the disk has an insulating main body, in which is integrated an electrical connection for contacting a stator conductor. The contact is manufactured in the form of a plug connection and/or with through-connections.

The published patent application DE 10 2014 207 621 A1 discloses a stator of an electric rotating machine, comprising a laminated stator core with multiple slits, a segmented winding with multiple phases and multiple base plates, which are laminated on each end of the laminated stator core in an axial direction. The laminated stator core and multiple winding bars of the segmented winding form a laminated stator core arrangement. The multiple base plates and multiple winding edge connectors of the segmented winding form multiple baseplate arrangements. The stator is configured by the laminated stator core arrangement and the multiple baseplate arrangements, which are laminated on each end of the laminated stator core arrangement.

Patent specification U.S. Pat. No. 5,623,178 A describes a multiphase motor, which has molded coil parts, which are separately inserted into a slot. The molded coil parts are connected to molded coil pieces of a further slot of the same phase via a connecting element. The connecting element has conductive elements, which are laminated in a direction perpendicular to a rotating shaft of the rotor in the motor via insulating layers. The molded coil parts are separately connected to each other by these conductive elements, by means of which the protrusion of a coil end from each slot is reduced, enabling the miniaturization and weight reduction of the motor. The dimensional precision of the connecting elements can furthermore be improved by means of a simple construction and manufacturing method, by way of which the properties of the electric motor can be significantly improved.

The published patent application US 2004/0100157 A1 describes an electric motor with a rotor and a stator, wherein the stator has a multiplicity of stator slots, which face the rotor. Stator cons are held in the multiplicity of stator slots. The stator coils comprise a multiplicity of bars, which are positioned within the stator slots, wherein each of the bars has at least one end which projects from one of the multiple stator slots. At least one end cap is arranged on the stator, wherein the at least one end cap has a multiplicity of jumpers. Each jumper has two connection channels, wherein each connection channel ends in an opening. The end cap arranged on the stator in such a way that ends of the multiplicity of bars, which project from the stator slots, are accommodated by the connection channels of the multiplicity of jumpers.

The invention is based on the object of providing a stator for an electric rotating machine, which with a minimal axial length, has improved electrical and thermal properties compared with the prior art.

SUMMARY OF THE INVENTION

According to the invention the object is achieved by a stator for an electric rotating machine, which has a laminated stator core with coil bars and at least one stator winding head board with an insulating main body, wherein the coil bars in each case have multiple subconductors, wherein conducting tracks are integrated into the insulating main body, wherein the at least one stator winding head board abuts an end face of the laminated stator core, wherein the conducting tracks are connected to the subconductors of the coil bars in a firmly bonded manner and wherein each subconductor is in each case connected to at least one separate conducting track.

According to the invention the object is also achieved by an electric rotating machine which has at least one stator of this kind.

According to the invention the object is further achieved by a pod drive with at least one electric rotating machine of this kind.

According to the invention the object is additionally achieved by a ship with at least one pod drive of this kind.

According to the invention the object is in addition achieved by a method for manufacturing a stator for an electric rotating machine, wherein the stator has a laminated stator core with coil bars and a stator winding head board with an insulating main body, wherein the coil bars in each case have multiple subconductors, wherein conducting tracks are integrated into the insulating main body, wherein the at least one stator winding head board is abutted to an end face of the laminated stator core, wherein the conducting tracks are connected in a firmly bonded manner to the subconductors of the coil bars and wherein each subconductor is connected in each case to at least one separate conducting track.

The advantages and preferred embodiments listed below in relation to the stator can be transferred analogously to the electric rotating machine, the pod drive, the ship and the manufacturing method.

The invention is based on the idea of reducing the axial length of the stator of an electric rotating machine with an output of at least one megawatt by redesigning the winding heads, which as a rule require a substantial axial installation space. While the windings in the area of the laminated stator core, which are located in particular in slots, continue to be embodied in their conventional form as coil bars, the winding heads are embodied as a stator winding head board, in which run conducting tracks which connect the respective coil bars to each other. The conducting tracks of the stator winding head board are surrounded by an insulating main body, which replaces the insulation of the conductors in the area of the winding heads. The winding head board abuts the laminated stator core, in particular directly and over its full area, so that at least part of the heat dissipation of the conducting tracks takes place via the laminated stator core, in particular if the insulating main body has a high level of thermal conductivity. Through the use of a stator winding head board of this kind the axial length of the stator is significantly shortened, and lower ohmic losses occur in the area of the winding heads. Here the coil bars are connected to the conducting tracks in a firmly bonded manner. For example the conducting tracks are welded or soldered to the coil bars. A firmly bonded connection saves a great deal of space, and requires no additional connecting elements. Accordingly the stator as a whole has a very minimal axial length.

The coil bars in each case have multiple subconductors, wherein each of the subconductors is connected in each case to at least one separate conducting track. At least one separate conducting track is thus assigned to each subconductor, so that the subconductors are routed individually through the insulating main body of the winding head board. As a result of the current deflection arising, the electrical resistance is reduced, and less heat loss needs to be dissipated. Furthermore, the surface of the individual subconductors, which is in direct contact with the insulating main body, is larger compared to a complete conductor, so that the heat dissipation in the area of the winding head board is further optimized. The smaller conducting track diameter of the individual subconductors gives rise to greater flexibility in the conducting track routing in the winding head board.

The firmly bonded connection is advantageously embodied as a welded connection. The coil bars are flat welded to the conducting tracks, in particular by means of laser welding, A welded connection saves space, and high forces and torques can be transmitted.

In one preferred embodiment, the stator winding head board is embodied in a multilayer fashion. A multilayer stator winding head board has multiple laminations of at least one insulating material, wherein the conducting tracks run in at least one lamination. By means of a multilayer stator winding head board it is possible to optimize the electrical, mechanical and thermal properties of the stator winding head board with respect to a minimal axial length and an efficient heat dissipation.

In a particularly advantageous manner, the multilayer stator winding head board comprises at least two layers arranged one on top of the other, which in each case have at least one conducting track. The routing of conducting track layers arranged one above the other can be realized in a flexible and space-saving manner.

In a further preferred embodiment the thickness of the conducting tracks amounts to at least several millimeters, in particular at least 3 millimeters, and a maximum of a few centimeters, in particular a maximum of 3 centimeters. By means of a conducting track thickness of this kind a high current load capacity is achieved and the ohmic losses are very low.

In a further advantageous embodiment the stator winding head board is connected to the laminated stator core by means of connecting elements, in particular bolts. A connection of this kind is proven and reliable.

In an advantageous manner, the connecting elements run through the laminated stator core in an axial direction. The connecting elements additionally for example hold the laminated stator core together, so that no additional bolts are required, thereby saving installation space and the cost of further connecting elements.

In one advantageous embodiment the stator winding head board is embodied as a pressure plate. The laminates of the laminated stator core are held together by pressure plates arranged at both axial ends of the laminated stator core. In particular, at least one pressure plate of the laminated stator core is replaced by a stator winding head board, so that overall axial installation space is saved.

Advantageously, the conducting tracks are in thermally conductive connection with the laminated stator core. In particular, the thermally conductive connection is created in a planar manner over the insulating main body. At least part of the heat dissipation of the conducting tracks thus takes place via the laminated stator core.

Advantageously, the insulating main body contains a ceramic material. In particular, the insulating main body consists at least in part of at least one ceramic material or a plastic, having portions of at least one ceramic material. Ceramic materials, such as for example aluminum oxide, beryllium oxide or silicon carbide, possess very good insulating properties, great robustness and good thermal conductivity, for example of at least 5 Wm-1K−1. In particular, the thermal conductivity of the ceramic material enables an at least partial heat dissipation of the conducting tracks via the laminated stator core, by means of which in particular fewer resources are required for cooling purposes in the stator winding head, and the installation space necessary for the stator winding head board is reduced, in particular in an axial direction. Furthermore, the very good insulating properties of the ceramic material enable a more compact arrangement of the conducting tracks, leading to an additional reduction of the necessary installation space of the stator winding head board.

Expediently, the insulating main body contains aluminum oxide. In particular, the insulating main body comprises at least 96% aluminum oxide or a plastic, having a proportion of aluminum oxide. As well as possessing high thermal conductivity and very good insulating properties, aluminum oxide is also comparatively low in cost.

In a further advantageous embodiment, the stator winding head board is manufactured at least partially with an additive manufacturing method. Additive manufacturing methods are for example 3D printing and screen printing. For example the insulating main body is manufactured with a 3D-printing method or a screen-printing method and the conducting tracks subsequently cast, for example with a die casting procedure. Alternatively, the conducting tracks are manufactured using a 3D printing or a screen-printing procedure. The insulating main body is then applied, for example by means of sintering. An additive manufacturing method enables the realization of complex and compact structures, resulting in a reduction in the size of the stator winding head board.

In one advantageous embodiment, the electric rotating machine has at least one stator of this kind. Particularly with the use of two or more stators on one shaft of the electric rotating machine, the axial length of the electric rotating machine is reduced through the use of stator winding head boards.

In a further advantageous embodiment, the stator winding head board has at least one spacer, via which the stator winding head board abuts the laminated stator core. The at least one spacer is, for example, manufactured from plastic or metal and matched in its form to that of the end faces of the laminated stator core. Alternatively, multiple spacers of, in particular, the same height are used, which are, for example, arranged in the circumferential direction on the end faces of the laminated stator core. The contact between the stator winding head board and the laminated stator core is improved by means of the spacers.

BRIEF DESCRIPTION OF THE DRAWING

The invention is described and explained in greater detail below, based on the exemplary embodiments shown in the figures.

It is shown in:
FIG. 1 a longitudinal section of an electric rotating machine,
FIG. 2 a three-dimensional section of a first embodiment of a stator in the area of a stator winding head board,
FIG. 3 a longitudinal section of a second embodiment of the stator in the area of the stator winding head board,
FIG. 4 a cross-section of the second embodiment of the stator in the area of the stator winding head board,
FIG. 5 a cross-section of a third embodiment of the stator in the area of the stator winding head board,
FIG. 6 a three-dimensional section of the stator winding head board, and
FIG. 7 a ship with a pod drive.

DETAILED DESCRIPTION OF PREFERRED EMBODIMENTS

Figure 7:
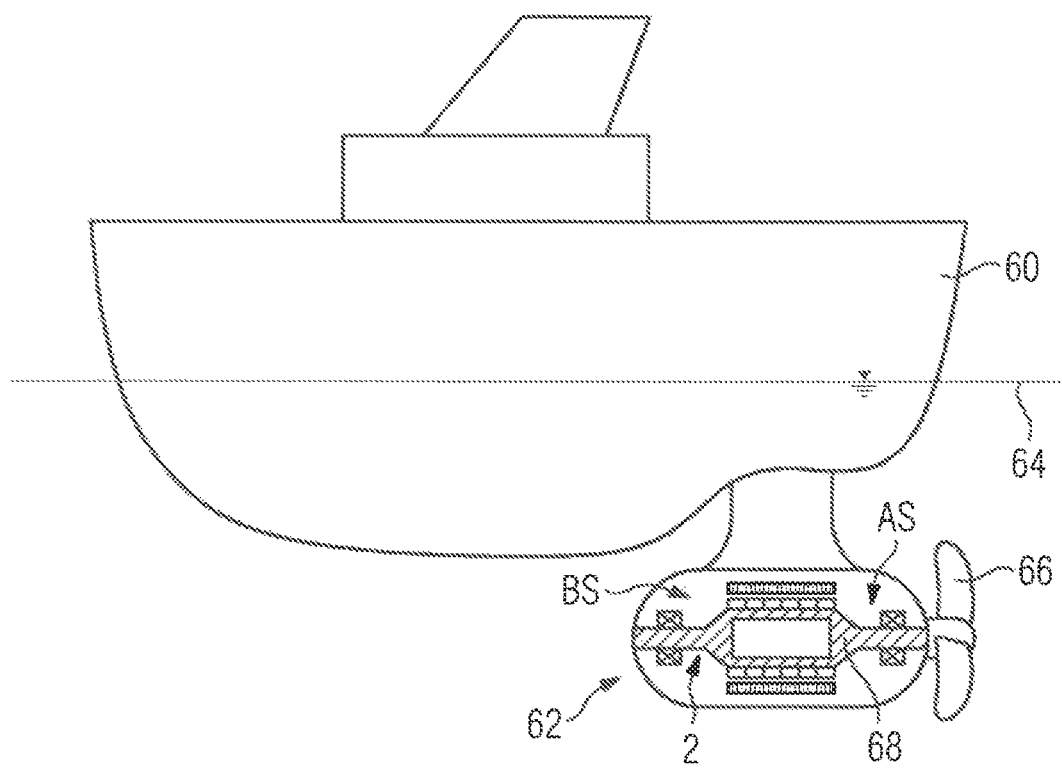

The same reference characters have the same meaning in the different figures.

FIG. 1 shows a longitudinal section of an electric rotating machine 2, which has a rotor 4, which can be rotated about an axis of rotation 6, and a stator 8 surrounding the rotor 4. Between the rotor 4 and the stator 8 is located a gap 10, which is preferably embodied as an air gap. The axis of rotation 6 defines an axial direction A, a radial direction R and a circumferential direction U. By way of example the electric rotating machine 2 is embodied as a synchronous machine 12 and has permanent magnets 14 on the rotor 4. The stator 8 comprises a laminated stator core 16 with windings 18. The windings 18 have coil bars 20, which run in the axial direction A in each case through a slot 22 of the laminated stator core 16. At least one stator winding head board 24 abuts both end faces 23 of the laminated stator core 16 in each case. For reasons of clarity, connections of the windings 18 to a junction box are not shown.

The stator winding head boards 24 have conducting tracks 26, which connect coil bars 20 running in the respective slots 22 to each other. The conducting tracks 26 of the stator winding head boards 24 are surrounded by an insulating main body 28, which creates a thermally conductive connection between the conducting tracks 26 and the laminated stator core 16. The conducting tracks 26 are further encapsulated by the insulating main body 28. The insulating main body 28 contains a ceramic material, for example aluminum oxide or aluminum nitrite, with a high thermal conductivity, in particular with a thermal conductivity of more than 5 W/mK. Alternatively, the insulating main body 28 contains a plastic, having portions of at least one ceramic material. Particularly with the use of a plastic it is necessary to provide additional cooling for the conducting tracks 26, for example via cooling channels.

The stator winding head board, which has a thickness in the centimeter range, in particular in the range of between 3 centimeters and 10 centimeters, is completely or at least partially manufactured with an additive manufacturing method. For example the insulating main body 28 is manufactured with a 3D-printing method or a screen-printing method and the conducting tracks 26 subsequently cast, for example with a die casting procedure. Alternatively, the conducting tracks 26 are manufactured with a 3D-printing method or a screen-printing method. The insulating main body 28 is then applied, for example by means of sintering. A further possibility for manufacturing the stator winding head board 24 is for both the conducting tracks 26 and the insulating main body 28 to be manufactured, preferably simultaneously, with a 3D-printing method or a screen-printing method.

FIG. 2 shows a three-dimensional section of a first embodiment of a stator 8 in the area of the stator winding head board 24. As shown in FIG. 1, the stator winding head board 24 abuts the laminated stator core 16, wherein the laminated stator core 16 has slots 22 and the form of the stator winding head board 24 in the area of the slots 22 is essentially matched to the form of the laminated stator core 16. The stator winding head board 24 is connected to the laminated stator core 16 via connecting elements 30, which are embodied as clamping pins 32. The stator winding head board 24 additionally assumes the function of a pressure plate, so that no additional pressure plate is required to hold the electrolaminates 36 of the laminated stator core 16 together.

A coil bar 20 with a main insulation 38 runs through the slot 22, wherein the slot 22 is closed by a slot closure wedge 39. The coil bar 20 has multiple subconductors 40, which in each case are lagged with a subconductor insulation 42. A side length of a cross-section of the subconductor 40 is in the area of at least a few millimeters, in particular at least 3 millimeters, and a maximum of several centimeters, in particular a maximum of 3 centimeters. The subconductors 40 are in each case connected to a conducting track 26, which runs through the insulating main body 28, via a firmly bonded connection 44. In particular, the firmly bonded connection 44 is embodied as a welded connection 46. For reasons of clarity, only one connection is represented between a subconductor 40 and a conducting track 26. The thickness D of a conducting track 26 amounts to at least a few millimeters, in particular at least 3 millimeters, and a maximum of a few centimeters, in particular a maximum of 3 centimeters. The further embodiment of the stator 8 corresponds to that in FIG. 1.

FIG. 3 shows a longitudinal section of a second embodiment of the stator 8 in the area of the stator winding head board 24, wherein the stator winding head board 24 has five layers 48, 50, 52, 54, 56. The conducting tracks 26 run in the second layer 50 and in the fourth layer 54. The third layer 52 insulates the conducting tracks 26 from each other. The subconductors 40 running within a coil bar 20 are connected in different layers 48, 50, 52, 54, 56 in each case to a conducting track 26. In the area of the firmly bonded connector 44 only, a recess is created in the subconductor insulation 42, in order to lengthen a creepage distance between a free end of the subconductor 40 and the laminated stator core 16. In addition, the hollow space in the slot 22 is filled with an insulating material, in order to prevent arcing. The further embodiment of the stator 8 corresponds to that in FIG. 2.

As the conducting tracks 26 of the stator winding head board 24 run very closely to the laminated stator core 16, eddy currents and thus accompanying warming of the axially external laminates of the laminated stator core 16 may occur as a result of residual magnetic fields. In order to prevent the spread of eddy currents in the laminated stator core 16, a laminate, not shown in FIG. 3, and which is preferably embodied as a copper sheet, is preferably inserted between the stator winding head board 24 and the laminated stator core 16. Alternatively, the copper sheet is embodied as an additional layer of the stator winding head board 24.

FIG. 4 shows a cross-section of the second embodiment of the stator 8 in the area of the stator winding head board 24. As shown in FIG. 3, the conducting tracks 26 run in the second layer 50 and in the fourth layer 54. The insulating third layer 52 enables the conducting tracks 26 to run on top of each other, either completely or in part, in order to save installation space, in particular in the case of complicated arrangements. The further embodiment of the stator 8 corresponds to that in FIG. 3.

FIG. 5 shows a cross-section of a third embodiment of the stator 8 in the area of the stator winding head board 24. The stator winding head board 24 has four layers 48, 50, 52, 54, wherein the conducting tracks 26 run in the second layer 50 and in the third layer 52. Particularly in the case of simpler arrangements, axial installation space is saved. Cooling channels 58 run through the stator winding head board 24, in order to cool the conducting tracks 26 in addition to the heat dissipation via the laminated stator core 16. The further embodiment of the stator 8 corresponds to that in FIG. 3.

FIG. 6 shows a three-dimensional section of a stator winding head board 24, which, as shown in FIG. 3 and FIG. 4, is embodied in five-layer form. The conducting tracks 26, which connect the coil bars 20 of the respective slots 22 to each other, run in the inner layers 50, 52, 54. For reasons of clarity, representation of the coil bars is dispensed with, and four conducting tracks 26 are shown solely by way of example. In order to minimize the ohmic losses caused by the length of the conducting tracks 26, and thus to increase efficiency, the minimum necessary connection path is selected for connection of the respective slots 22. In particular, the conducting tracks 26 in each case run in one layer 50, 52, 54. The conducting tracks 26 can however also run in multiple layers 50, 52, 54.

As the electric rotating machine 2 has a large diameter, for example of at least one meter, it is necessary under certain circumstances to divide the stator winding head board 24, which as a whole has a circular ring-shaped cross-section, into at least two sub-boards which are essentially in the form of circular ring sectors, which are then put together. The further embodiment of the stator winding head board 24 corresponds to that in FIG. 3.

FIG. 7 shows a ship 60 with a pod drive 62. The pod drive 62 is located below the surface of the water 64, and has an electric rotating machine 2 and a propeller 66, wherein the propeller 66 is connected to the electric rotating machine 2 via a shaft 68. The shaft 68 has a bearing 70 on a drive side AS and a non-drive side BS in each case. The use of a stator winding head board 24 which is not shown FIG. 7 for reasons of clarity, and the associated optimal axial length of the stator 8 of the electric rotating machine 2, enable a small clearance between the two bearings 70. A narrow bearing clearance has a positive effect on the rotor dynamics.

The invention claimed is:

1. A stator for an electric rotating machine, said stator comprising:
   a laminated stator core;
   coil bars received in the laminated stator core, each said coil bar including multiple subconductors; and
   a stator winding head board abutting an end face of the laminated stator core and including an insulating main body having integrated therein conducting tracks which are connected to the subconductors of the coil bars by a firmly bonded connection,
   wherein the subconductors are connected to separate concluding tracks, respectively.

2. The stator of claim 1, wherein the firmly bonded connection is embodied as a welded connection.

3. The stator of claim 1, wherein the stator winding head board is a multilayer stator winding head board.

4. The stator of claim 3, wherein the multilayer stator winding head board comprises at least two layers arranged one on top of the other, each said layer including at least one of the conducting track.

5. The stator of claim 1, wherein the conducting tracks have a thickness of at least three millimeters and a maximum of three centimeters.

6. The stator of claim 1, further comprising a connecting element for connecting the stator winding head board to the laminated stator core.

7. The stator of claim 6, wherein the connecting element is a clamping pin.

8. The stator of claim 6, wherein the connecting element runs through the laminated stator core in an axial direction.

9. The stator of claim 1, wherein the stator winding head board is embodied as a pressure plate.

10. The stator of claim 1, wherein the conducting tracks are in a thermally conductive connection with the laminated stator core.

11. The stator of claim 1, wherein the insulating main body contains ceramic material.

12. The stator of claim 1, wherein the insulating main body contains aluminum oxide.

13. The stator of claim 1, wherein the stator winding head board is manufactured at least in part with an additive manufacturing method.

14. The stator of claim 1, wherein the stator winding head board has at least one spacer, via which the stator winding head board abuts the laminated stator core.

15. An electric rotating machine, comprising a stator, said stator comprising a laminated stator core, coil bars received in the laminated stator core, each said coil bar including multiple subconductors, and a stator winding head board abetting an end face of the laminated stator core and including an insulating main body having integrated therein conducting tracks which are connected to the subconductors of the coil bars by a firmly bonded connection, wherein the subconductors are connected to separate conducting tracks, respectively.

16. A pod drive, comprising an electric rotating machine as set forth in claim 15.

17. A ship, comprising a pod drive as set forth in claim 16.

18. A method for manufacturing a stator for an electric rotating machine, said method comprising:
providing each of a plurality of coil bars of multiple subconductors;
placing the coil bars hi a laminated stator core;
abutting a stator winding head board upon an end face of the laminated stator core;
integrating conducting tracks hi an insulating main body of the stator winding head board; and
connecting the conducting tracks to the subconductors of the coil bars in a firmly bonded manner such that each subconductor is connected to at least one separate conducting track.

19. The method of claim 18, further comprising connecting the stator winding head board to the laminated stator core via a connecting element.

20. The method of claim 19, further comprising mounting the connecting element such as to run through the stator in an axial direction.

21. The method of claim 18, further comprising using the stator winding head board as a pressure plate.

22. The method of claim 18, further comprising mounting the stator winding head board in such a way that the conducting tracks are in a thermally conductive connection with the laminated stator core.

23. The method of claim 18, further comprising manufacturing the stator winding head board at least in part with an additive manufacturing method.

24. The method of claim 18, wherein the stator winding head board has a spacer, via which the stator winding head board abuts upon the laminated stator core.

* * * * *

UNITED STATES PATENT AND TRADEMARK OFFICE
CERTIFICATE OF CORRECTION

| | |
|---|---|
| PATENT NO. | : 11,496,025 B2 |
| APPLICATION NO. | : 16/334245 |
| DATED | : November 8, 2022 |
| INVENTOR(S) | : Horst Kuemmlee |

It is certified that error appears in the above-identified patent and that said Letters Patent is hereby corrected as shown below:

On the Title Page

(30) Foreign Application Priority Data:
Replace "EP 16189489" with the correct -- EP 16189489.4 --.

In the Claims

In Column 9, Claim 15, Line 24 replace "abetting" with -- abutting --.
In Column 10, Claim 18, Line 5 replace "hi" with -- in --.
In Column 10, Claim 18, Line 8 replace "hi" with -- in --.

Signed and Sealed this
Twenty-seventh Day of December, 2022

Katherine Kelly Vidal
*Director of the United States Patent and Trademark Office*